United States Patent [19]
Honda et al.

[11] 3,949,829
[45] Apr. 13, 1976

[54] EXHAUST SILENCER FOR MOTORCYCLE

[75] Inventors: Soichiro Honda, Tokyo; Minoru Morioka, Niiza; Takeshi Tukahara, Kawagoe, all of Japan

[73] Assignee: Honda Giken Kogyo Kabushiki Kaisha, Japan

[22] Filed: Dec. 18, 1974

[21] Appl. No.: 533,864

[30] Foreign Application Priority Data
Dec. 22, 1973 Japan................................. 49-2247

[52] U.S. Cl............. 181/36 D; 180/33 R; 180/64 A
[51] Int. Cl.²......................... F01N 3/06; B62D 3/00
[58] Field of Search........ 181/35 B, 36 B, 36 D, 40, 181/46, 47 R, 56, 57, 60, 61; 180/33 R, 33 A, 35, 64 A

[56] References Cited
UNITED STATES PATENTS

| | | | |
|---|---|---|---|
| 1,413,351 | 4/1922 | Peters.................................. | 180/35 |
| 2,940,249 | 6/1960 | Gospodar............................ | 181/36 D UX |
| 3,786,890 | 1/1974 | Shank................................. | 180/64 A |
| 3,827,529 | 8/1974 | Frietzsche et al.................. | 181/40 X |

FOREIGN PATENTS OR APPLICATIONS

| | | | |
|---|---|---|---|
| 157,455 | 11/1939 | Germany........................... | 180/33 R |
| 447,413 | 5/1936 | United Kingdom............... | 180/33 R |

*Primary Examiner*—John F. Gonzales
*Attorney, Agent, or Firm*—Polster and Polster

[57] ABSTRACT

An exhaust silencer, or muffler, for a motorcycle, wherein a pair of exhaust silencer tubes extending along the lengthwise direction of the body of the motorcycle are communicatively connected at their one end with both ends of a connecting tube extending in the breadthwise direction of the motorcycle body to increase the engine output and improve the silencing effect.

2 Claims, 3 Drawing Figures

EXHAUST SILENCER FOR MOTORCYCLE

BACKGROUND OF THE INVENTION

This invention relates to an exhaust silencer, or muffler, for motorcycles.

As has been well known, the exhaust silencer, is capable of improving the output of the engine and of reducing undesirable noise at the exhaustion only when it is given a sufficient volumetric capacity. However, it is often difficult to obtain such sufficient volumetric capacity of the exhaust silencer for motorcycles for the reasons of the body construction of the motorcycle, its external appearance, and various other factors. Owing to this, the conventional exhaust silencer for the motorcycle has been designed in such a manner that each of two silencers in tubular form, which are usually mounted on both lower sides of the motorcycle body, is directly connected to each of the exhaust pipes extending from the engine of the motorcycle, and the silencer pipe is shaped in a form that maintains the minimum overall breadth of the motorcycle as stipulated by laws and regulations.

In view of the foregoing problems, the present invention proposes to increase the volumetric capacity of the exhaust silencer by utilizing a portion of the motorcycle body which constitutes a dead space without affecting the aesthetic outer appearance of the motorcycle as a whole.

It is therefore an object of the present invention to provide an exhaust silencer for a motorcycle having an increased volumetric capacity.

It is another object of the present invention to provide an exhaust silencer for a motorcycle having a connecting tube for a pair of exhaust silencers, which is disposed at a space between the rear wheel and a rear part of the motorcycle body.

It is still another object of the present invention to provide an exhaust silencer for a motorcycle, in which exhaust pipes from the motorcycle engine are accommodated within the connecting tube in a crossed arrangement.

SUMMARY OF THE INVENTION

Briefly speaking, according to the present invention, there is provided an exhaust silencer for a motorcycle which comprises a pair of silencer tubes fitted securely on both sides of a motorcycle body, and a connecting tube disposed in a space between the rear wheel and a rear part of the motorcycle body in the breadthwise direction thereof, both ends of which are communicatively connected to one end of each of the pair of exhaust silencer tubes to provide an increased volumetric capacity as a part of an exhaust gas expansion chamber and improved silencing effect as well.

The foregoing objects and other objects as well as the actual construction and function of the exhaust silencer according to the present invention will become more apparent from the following detailed description of the invention, when read in conjunction with the accompanying drawing.

DETAILED DESCRIPTION OF THE INVENTION

Figure 1:
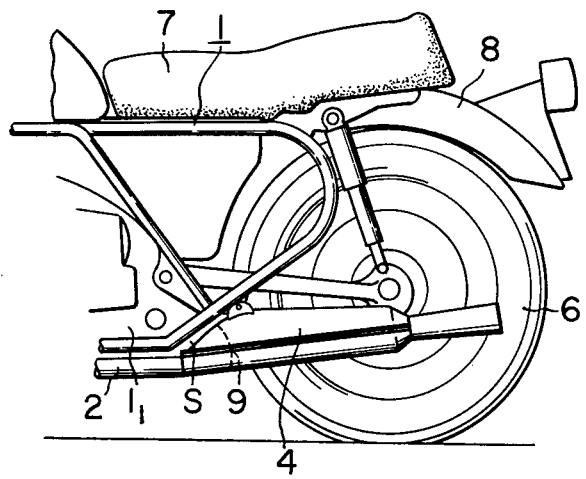
FIG. 1 is a partial side elevational view showing a rear part of the motorcycle, on which the exhaust silencer of the present invention is mounted.

Referring now to the drawings, the motorcycle assembly comprises a motorcycle body 1, a pair of exhaust pipes 2 and 3, a pair of mufflers or exhaust silencer tubes 4 and 5, a rear wheel 6, a saddle seat 7, and a rear fender 8.

As has already been mentioned in the foregoing, the gist of the present invention resides in communicatively connecting one end of each of the pair of silencer tubes 4 and 5 mounted on both left and right sides of the motorcycle body with both ends of a cylindrical tube 9 disposed in the open dead space 5 existing between the rear wheel 6 and the rear part $1_1$ of the motorcycle body 1 such as, for example, above a transmission case.

In the construction of the exhaust silencer according to the present invention, the tube 9 connecting the silencer tubes 4 and 5 at both sides of the motorcycle body constitutes a part of the exhaust gas expansion chamber. Thus, with increase in the capacity of the exhaust silencer, the engine output improves accompanied by satisfactory silencing effect.

Besides such effect, the provision of the connecting tube 9 ensures an area increase for enhancing cooling effect of the silencer tubes. In other words, during running of the motorcycle, air passes on the surface portion of this connecting tube 9 in addition to the silencer tubes, thereby positively cooling the silencer tube as a whole. In the conventional silencer tube which is simply mounted on the body of the motorcycle in the lengthwise direction thereof, i.e., along the longitudinal direction of the motorcycle body with the tube diameter being increased as it extends rearward, i.e., in a somewhat tapered shape, air simply passes on the outer surface of such longitudinally arranged exhaust silencer tube.

According to the present invention, it becomes also possible that the length of the exhaust pipes is extended fairly freely and selectively, which is effective in augmenting the engine output. Further, the length of the exhaust pipe is in no way restricted by the length of the motorcycle body.

As the connecting tube 9 according to the present invention is positioned in a dead space created between the rear part of the motorcycle body and the rear wheel, no external appearance from the design point of view is impaired, hence it is highly advantageous in improving the efficiency of the exhaust silencer for motorcycles.

Figure 2:
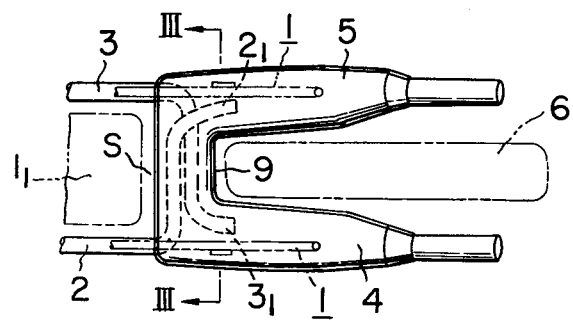
FIG. 2 is a plan view of the exhaust silencer according to the present invention shown in FIG. 1.
Figure 3:
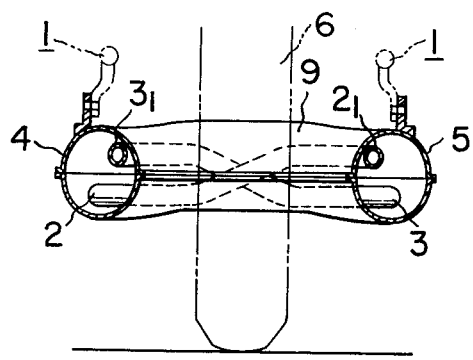
FIG. 3 is an enlarged cross-sectional view taken along the line III—III' in FIG. 2 above.

Further, when the exhaust tubes 2 and 3 are crossed each other within the space provided in the connecting tube as shown in FIGS. 2 and 3, where indicated with numerals $2_1$ and $3_1$, the total length of the exhaust pipes results in substantial extension, thereby advantageously increasing the engine output.

The exhaust silencer according to the present invention can be manufactured by connecting each end of the silencer tubes 4 and 5 mounted on both sides of the motorcycle body with both ends of the connecting tube 9 by a known expedient such as welding, etc. Besides this method, it is also possible to manufacture the same by press-working a halved portion of the exhaust silencer in a U-shape as shown in FIG. 2 cut along the axial direction of the tube, and a pair of such counterparts are seamed at their abutting portions.

As has been described specifically in the foregoing, the present invention presents various advantages in increasing the efficiency of the exhaust silencers for motorcycles. Although the invention has been explained with particular details in reference to a specific, preferred embodiment, it should be understood that any change and modification may be made thereto within the spirit and scope of the present invention as recited in the appended claims.

What is claimed is:

1. An improved exhaust structure for a motorcycle which comprises:
    a. a pair of exhaust silencer tubes securely mounted on both sides of a body of the motorcycle in the lengthwise direction thereof;
    b. a connecting tube of a length lying breadthwise in a dead space between a rear part of said motorcycle body and a rear wheel in an intersecting manner, said pair of exhaust silencer tubes and said connecting tube being integrally and communicatively connected in substantially U-shaped structure to provide an increased space for said exhaust silencer without constituting any part of the motorcycle body; and
    c. at least a pair of exhaust pipes extending from a motorcycle engine into said exhaust silencer tubes and along the lengthwise direction thereof.

2. The improved exhaust structure for the motorcycle as claimed in claim 1, wherein said pair of exhaust pipes cross each other within said connecting tube.

* * * * *